US010482918B1

(12) United States Patent
Erden et al.

(10) Patent No.: US 10,482,918 B1
(45) Date of Patent: Nov. 19, 2019

(54) CHANGING BIT SPACING FOR SELECTED SYMBOLS WRITTEN TO A MAGNETIC RECORDING MEDIUM

(71) Applicant: Seagate Technology LLC, Cupertino, CA (US)

(72) Inventors: Mehmet Fatih Erden, St. Louis Park, MN (US); Stephanie Hernandez, Plymouth, MN (US); Steven Douglas Granz, Shakopee, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 16/104,332

(22) Filed: Aug. 17, 2018

(51) Int. Cl.
  *G11B 5/09* (2006.01)
  *G11B 20/10* (2006.01)
  *G11B 20/18* (2006.01)

(52) U.S. Cl.
  CPC .......... *G11B 20/105* (2013.01); *G11B 20/182* (2013.01)

(58) Field of Classification Search
  None
  See application file for complete search history.

(56) References Cited

U.S. PATENT DOCUMENTS

| 5,404,248 | A | * | 4/1995 | Shimoda | G11B 20/10009 360/27 |
| 5,774,470 | A | * | 6/1998 | Nishiya | G11B 20/10009 714/703 |
| 6,005,731 | A | | 12/1999 | Foland, Jr. et al. | |
| 6,337,778 | B1 | | 1/2002 | Gagne | |
| 6,404,570 | B1 | | 6/2002 | McNeil et al. | |
| 6,603,617 | B1 | * | 8/2003 | Cross | G11B 5/012 360/31 |
| 6,714,368 | B1 | * | 3/2004 | Himle | G11B 5/012 324/212 |
| 2003/0151838 | A1 | * | 8/2003 | Sawaguchi | G11B 20/10055 360/46 |
| 2006/0227446 | A1 | | 10/2006 | Elliott et al. | |
| 2009/0147647 | A1 | * | 6/2009 | Kurokawa | G11B 7/00458 369/59.11 |

* cited by examiner

*Primary Examiner* — Peter Vincent Agustin
(74) *Attorney, Agent, or Firm* — Mueting, Raasch & Gebhardt, P.A.

(57) ABSTRACT

A set of patterns written to a magnetic recording medium are found that result in a relatively high and/or low error when read back. Upon writing subsequent to the determining of the set of patterns, one pattern of the set of the patterns is identified within a data segment ready to be written to the magnetic recording medium. The data segment is written with a changed bit spacing in response to identifying that the one pattern of the set of the patterns is within the data segment.

20 Claims, 7 Drawing Sheets

CHANGING BIT SPACING FOR SELECTED SYMBOLS WRITTEN TO A MAGNETIC RECORDING MEDIUM

SUMMARY

The present disclosure is directed to changing bit spacing for selected patterns written to a magnetic recording medium. In one embodiment, a set of patterns written to a magnetic recording medium are found that result in a relatively high and/or low error when read back. Upon writing subsequent to the determining of the set of patterns, one pattern of the set of the patterns is identified within a data segment ready to be written to the magnetic recording medium. The data segment is written with a changed bit spacing in response to identifying that the one pattern of the set of the patterns is within the data segment.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure generally relates to data storage devices that utilize magnetic storage media, e.g., disks. These data storage devices utilize write transducers (e.g., a magnetic coil) that apply a changing magnetic field to the recording medium. The applied field changes magnetic orientation in regions of the recording medium, which define bit boundaries of the stored data. A series of adjacent bits recorded along a circular path defines a data track on the recording medium. A read transducer (e.g., magnetoresistive sensor) can later traverse the track and detect the magnetic transitions. These transitions form a signal via the read transducer which is decoded to recover the stored data.

During the write process, user bits are first encoded and then written onto the magnetic recording medium using a write-head. During the read process, read head detects the encoded data from the desired location on the medium, and the noisy analog signals are then processed by the read channel architectures to extract the written data as a series of bits that represent the recorded data. These bits are then decoded to extract the user data, which may be further processed (e.g., error correction codes applied) before being communicated to a host computer.

For a given system operating point, there are bit patterns written to the recording medium that result in worse resolution than other patterns during reading. These bit patterns result in worse detection and correction capability for read-channel architectures. The performance of the overall system is mainly defined with those patterns as they play a role in design of the channel codes that correct system errors. On the other hand, the patterns with excess resolution don't affect the system performance that much, yielding opportunities to further optimize the system. In this disclosure, methods and apparatuses are proposed which change the resolution of bit patterns written on magnetic media in order to increase the overall system capacity.

Figure 1:
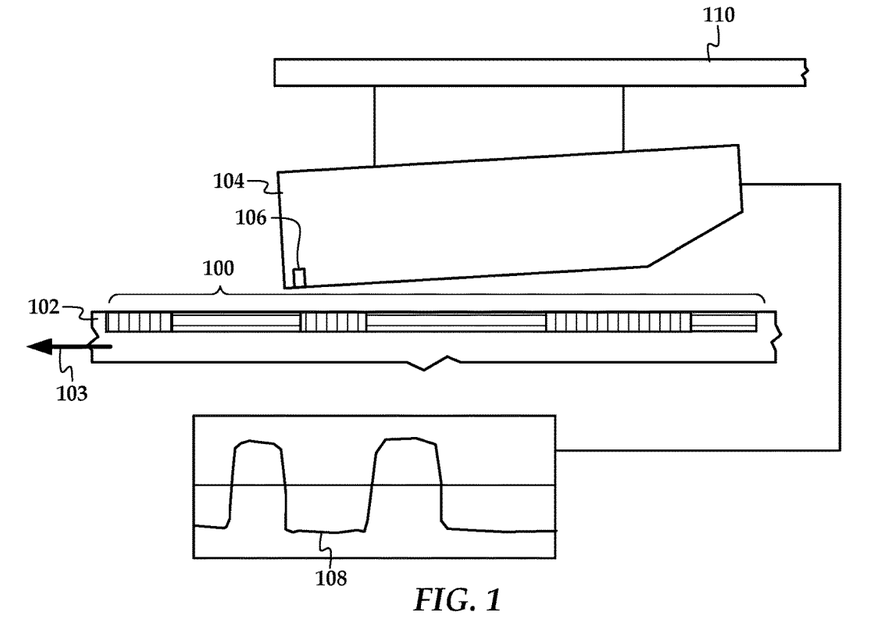
FIG. 1 is a block diagram illustrating a read head and recording medium according to an example embodiment.

In FIG. 1, a block diagram illustrates a magnetic head 104 and recording medium (e.g., magnetic disk 102) according to an example embodiment. Differently shaded regions 100 represent bits recorded on the disk 102. The disk 102 rotates (as indicated by arrow 103) while a magnetic head 104 (also referred to as a recording head, read/write head, read head, write head, slider, etc.) is held over a top surface of the medium 102. The magnetic head 104 can be moved over different tracks of the disk 102 by an arm 110.

The magnetic head 104 has a read transducer 106 (also referred to here as a reader) that produces an analog data signal 108 in response to the changes in magnetic orientation of the recorded bits. Each positive or negative transition of the signal 108 corresponds to a bit transition. Note that the form of signal 108 is provided for purposes of illustration, and may take other forms depending on the signal path, encoding/decoding schemes, etc. The bit transitions detected in signal 108 are detected and time adjusted so as to correspond to a transition of a data clock. The data clock signal may be implied, e.g., timing of the signal 108 may be derived based on the signal itself instead of referencing a hardware clock or other time source.

In some cases, the read channel that processes the signal 108 may experience greater than average errors in detecting and decoding particular patterns of user data bits that are encoded in the signal 108. These errors may be caused by a number of phenomena, such as less signal and more noise associated with that pattern, non-linear response of the recording medium 102 and/or reader 106, characteristics of the electrical pathways that distort the signal 108 before it is received by the processing circuitry, etc. A read channel (not shown) that processes the signal 108 may experience a higher amount of errors when detecting and decoding these particular patterns. Similarly, other patterns may be enhanced by the above-described phenomena, and therefore may exhibit lower than average errors when being detected and decoded.

Figure 2:
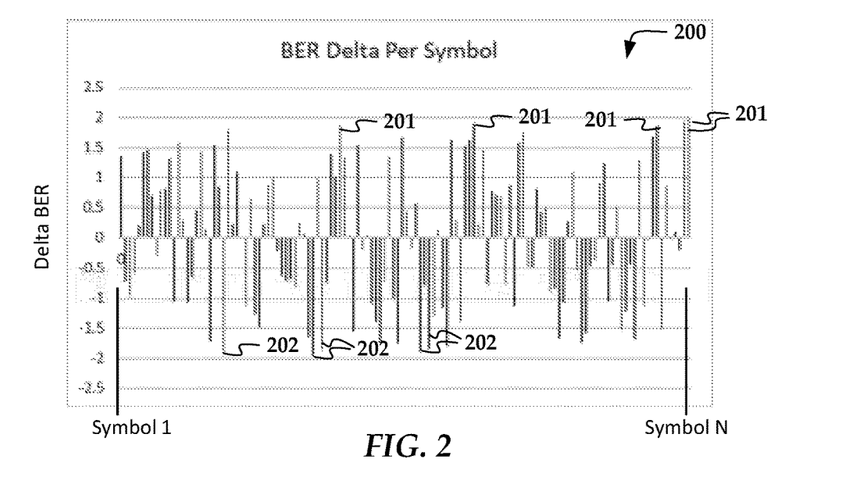
FIG. 2 is a graph showing errors of different patterns according to an example embodiment.

In embodiments described below, a drive is configured to analyze and classify patterns based on errors exhibited when reading the patterns back. A write channel is configured to increase the resolution of worst case patterns, and alternatively or additionally, reduce the resolution of the patterns having smaller than average errors. In FIG. 2, a graph 200 shows how patterns may be categorized to perform one or both of these resolution-adjustment operations according to an example embodiment.

The graph in FIG. 2 is a simplified example that assumes the bit-error rate (BER) of N-random symbols stored on drive have been averaged over a large sample size. The symbols correspond to pattern of magnetic fields written to the recording medium and then read back, which does not necessarily correspond to the user data decoded from the values. Each of the bars in the graph 200 represent a change in BER over average BER for each of the symbols. The symbols 201 represent the five patterns having the highest BER over average and the symbols 202 represent the five patterns having the lowest BER over the average. It will be understood that this graph is a simplified example, and different pattern sizes and maximum/minimum values may be selected in other embodiments. In addition, other characteristics such as signal-to-noise ratio may be used instead of BER to select the symbol patterns 201, 202.

Figure 3:
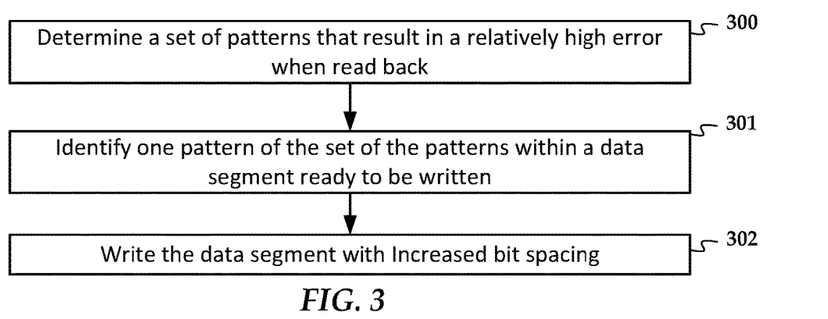
FIGS. 3-5 are flowcharts of a process according to an example embodiment.

In FIG. 3, a flowchart shows a procedure used to improve resolution of patterns with high errors (e.g., symbols 201 in FIG. 2) according to an example embodiment. The procedure involves determining 300 a set of patterns written to a magnetic recording medium that result in a relatively high error when read back. Upon writing subsequent to the determining 300 of the set of patterns, one pattern of the set of the patterns is identified 301 within a data segment ready to be written to the magnetic recording medium. In response to identifying 301 that the one pattern of the set of the patterns is within the data segment, the data segment is written 302 with increased bit spacing.

Figure 4:
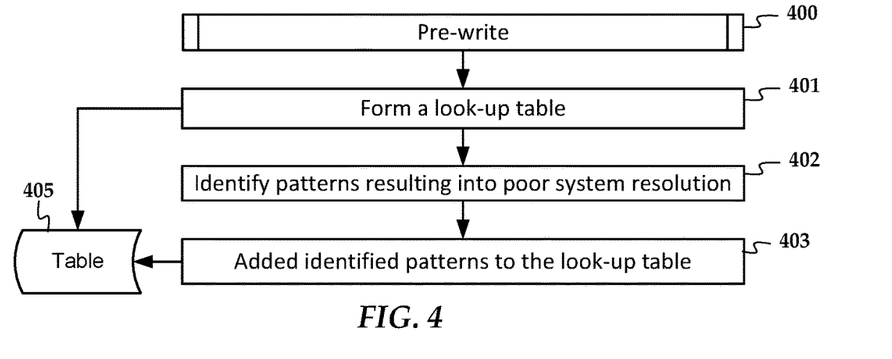
Figure 5:
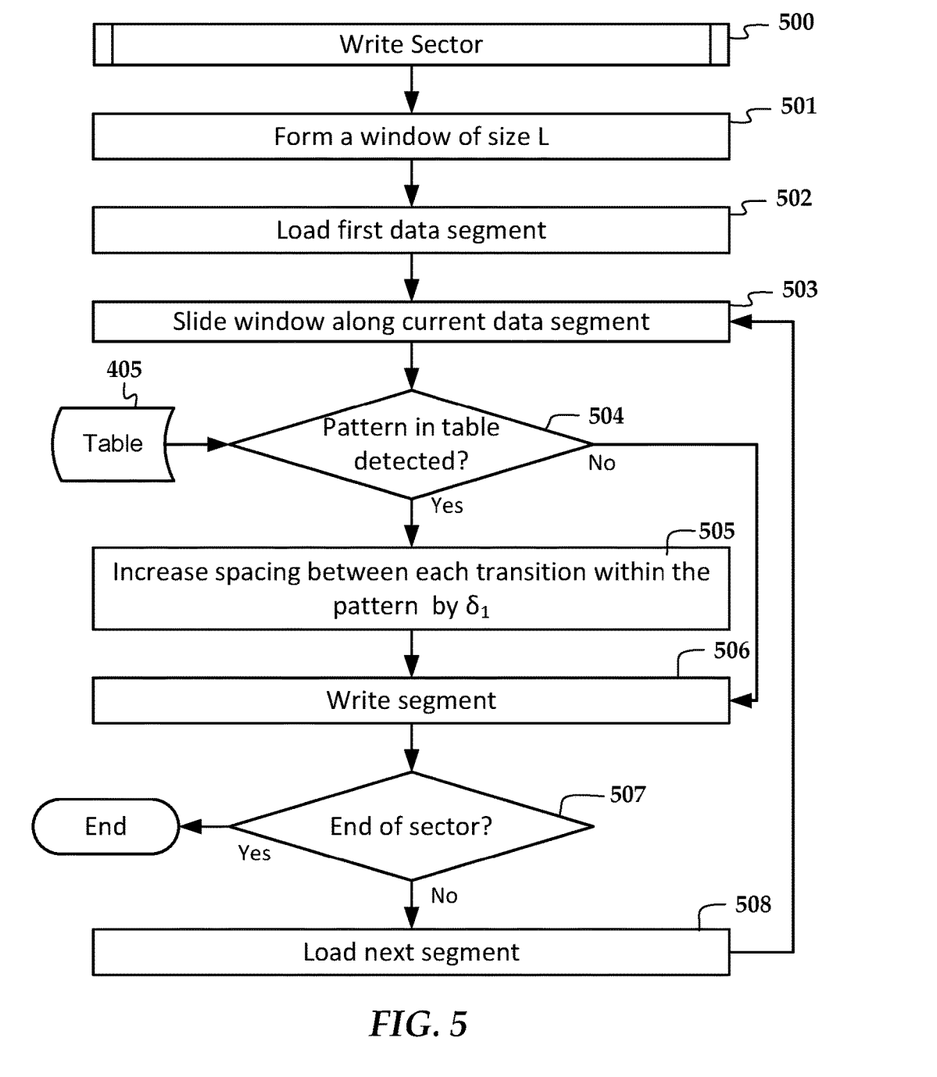

In FIGS. 4 and 5, flowcharts show a more detailed procedure to improve resolution according to an example embodiment. A pre-write procedure 400 shown in FIG. 4 involves forming 401 look-up table 405 (or other data structure) having patterns with bad resolution. For example, this table may be formed by looking the error events at the output of the channel detector with highest percentage of occurrences. For example, this may include the top-N error events, or error events with occurrence percentages higher than a predefined value. Within those error events, patterns resulting into bad system resolution are identified 402 and added 403 to the look-up table 405.

A write process 500 is shown in FIG. 5 that involves the writing of an individual sector, although may be used to write any contiguous data regions. In the write process 500, a window of size L is formed 501, where L is the length of the longest pattern in the look-up table 405. The first data segment is loaded 502 (e.g., into a memory buffer) and window is slid 503 along the data segment starting from the first channel bit until one of the patterns in the table 405 is detected 504. If one of the patterns is detected (block 504 returns 'yes'), write channel pre-compensation circuitry is set such that the spacing between each transition within the pattern is increased 505 by a predefined fractional amount of the bit width, $\delta_1$. The segment is written 506 and it is determined 507 whether the end of sector has been reached. If not, then the next segment is loaded 508 and the process repeats until the end of the data sector.

In a drive that uses heat-assisted magnetic recording (HAMR), a laser or other heat source forms a hot spot on the disk while recording. This locally lowers the coercivity at the hotspot allowing a write pole to change the magnetic orientation of the hotspot without affecting areas just outside the hotspot. In case of HAMR, in addition to utilizing the pre-compensation circuitry, laser power modulation can have a similar effect. Because an increase or decrease in laser current changes a size of the hotspot, it will also change locations of bit transitions if timed appropriately with the bit transitions.

Figure 6:
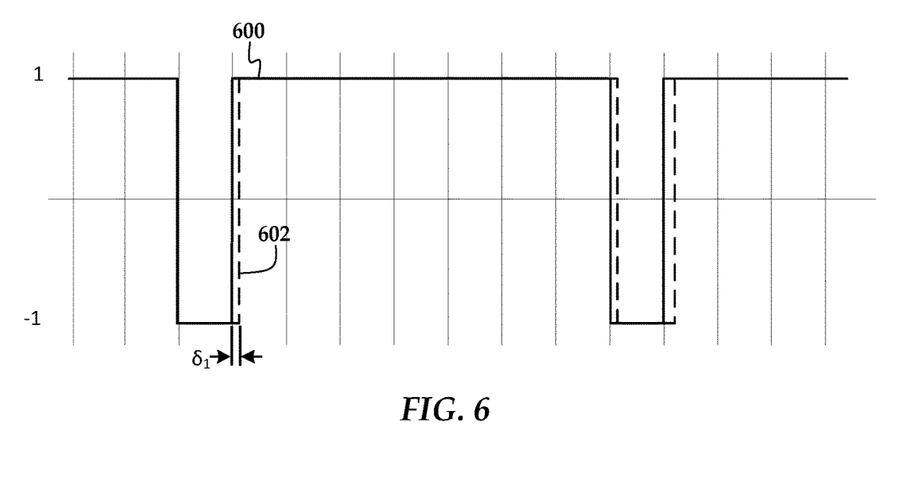
FIG. 6 is a diagram showing a signal waveform according to an example embodiment.

In FIG. 6, a signal diagram shows the increasing of bit resolution according to an example embodiment. Waveform 600 represents nominal bit timing used to write a series of bits to the recording medium. Waveform 602 (dashed lines) represents the same series of bits written with the time of each transition increased by the fractional amount $\delta_1$. Assuming this increase is applied to each transition, the total length of the data sector will increase. In some applications, such as cold storage, the sector boundaries can be dynamic and so this will not result in overwriting subsequent sectors. In other applications, the sector-to-sector spacing can be overprovisioned to account for some amount of sector size change. Note that upon reading the signal 602 back, the timing recovery circuits in the read channel will adjust to compensate for the increased spacing between signal transitions when detecting the bits.

One specific case of the proposed algorithm above can be visualized as a generalization of the conventional (d, k) modulation codes with fractional d parameter. A (d, k) modulation code corresponds to having d repetitions of the bit when a transition is observed and having a transition after k runs of constant bits. For example, (0,7) modulation code does not require any forced repetition when a transition happens, while forces a transition when 7 consecutive 1s or −1s are observed. On the other hand, (1,7) code, where d=1, requires 1 forced repetition of the same bit when a transition occurs while the k constraint acts the same. More specifically, for a sequence of channel bits equal to 1 1 −1 1 1 1 1 1 1 1 1 1, a (0,7) encoder yields 1 1 −1 1 1 1 1 1 1 1 −1 1 1 while (1,7) encoder yields 1 1 −1 −1 1 1 1 1 1 1 1 −1 −1 1 1.

Having a d constraint in a (d, k) code introduces redundancies. Even when k is approaching infinity, the capacity of the (1, k) code is 69.42%, results in more than 30% redundant bits, which becomes inefficient for magnetic recording. On the other hand, as defined above, the proposed algorithm (for the pattern of having a transition) corresponds to repeating the bit by a fractional amount of it whenever there are two consecutive transitions (not when there is only one single transition as defined conventionally). For example, increasing the bit length by 10% whenever there are two consecutive transitions corresponds to d equal to 0.1 in this terminology. The extra length required on the magnetic medium with fractional d parameter requires around 3% extra code redundancy and helps to better optimize the system by choosing the fraction accordingly. In embodiments described below, the bit transitions can be increased between by a fractional amount between 1% to 100% of a single bit spacing. In embodiments where the bit transitions are decreased, the decrease would be by a fractional amount between 1% to 50% of a single bit spacing.

Figure 7:
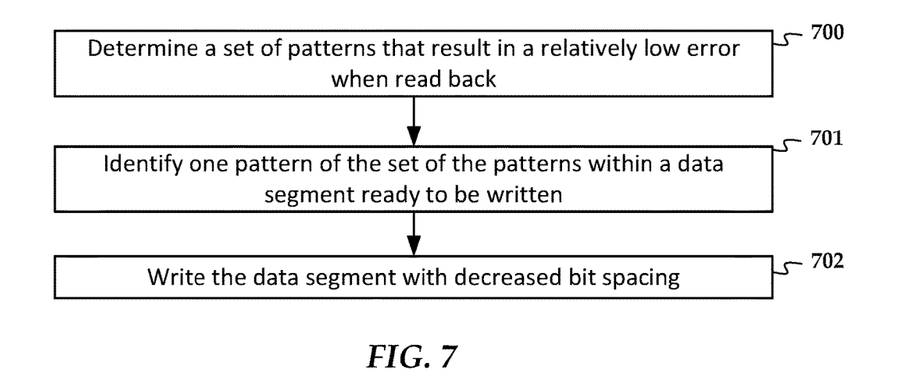
FIGS. 7-9 are flowcharts of a process according to another example embodiment.

As noted above, a similar process can be applied to patterns that have unusually low error rates, except that bit resolution is decreased in such a case instead of increased. In FIG. 7, a flowchart illustrates a procedure used to reduce resolution of patterns with low errors (e.g., symbols 202 in FIG. 2) according to an example embodiment. The procedure involves determining 700 a set of patterns written to a magnetic recording medium that result in a relatively low error when read back. Upon writing subsequent to the determining 700 of the set of patterns, one pattern of the set of the patterns is identified 701 within a data segment ready to be written to the magnetic recording medium. In response to identifying 701 that the one pattern of the set of the patterns is within the data segment, the data segment is written 702 with decreased bit spacing.

Figure 8:
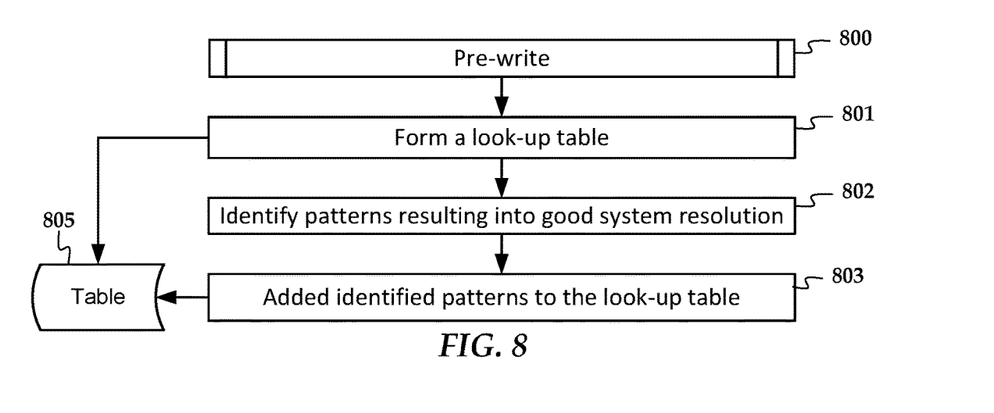
Figure 9:
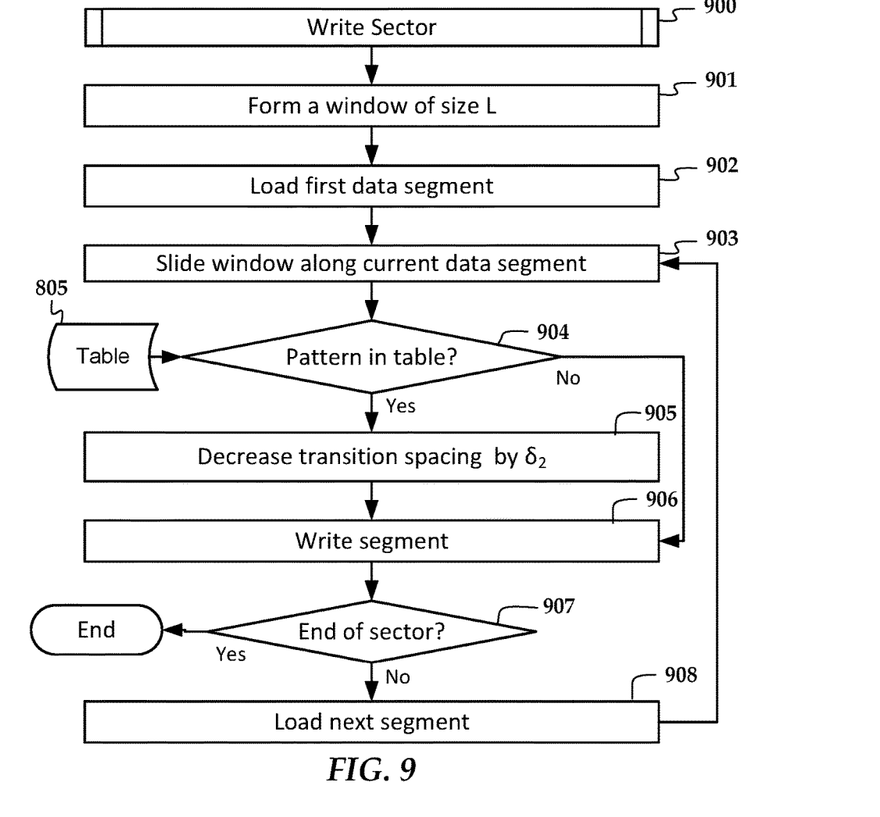

In FIGS. 8 and 9 flowcharts show a more detailed procedure to change resolution according to an example embodiment. In FIG. 8, a prewrite procedure 800 involves forming 801 a look-up table 805 used to store patterns with good resolution. The patterns are identified 802 and added to the table 805. For example, identifying 802 the patterns may involve writing a pseudo-random bit sequence (PRBS) to the recording medium and the reading the PRBS read back. The signal-to-noise ratio (SNR) of each pattern in the PRBS is calculated and the patterns with good (high) SNRs are identified 802 and added 803 to the table 805.

In FIG. 9, a write process 900 reduce the resolution of the patterns with good resolution within a data sector (or other data region). In the write process 900, a window of size L is formed 901, where L is the length of the longest pattern in the look-up table 805. The first data segment is loaded 902 (e.g., into a memory buffer) and window is slid 903 along the data segment starting from the first channel bit until one of the patterns in the table 805 is detected 904. If one of the patterns is detected (block 904 returns 'yes'), write channel pre-compensation circuitry is set such that the spacing between each transition within the pattern is decreased 905 by a predefined fractional amount of the bit width, $\delta_2$. The segment is written 906 and it is determined 907 whether the end of sector has been reached. If not, then the next segment is loaded 908 and the process repeats until the end of the data sector.

Figure 10:
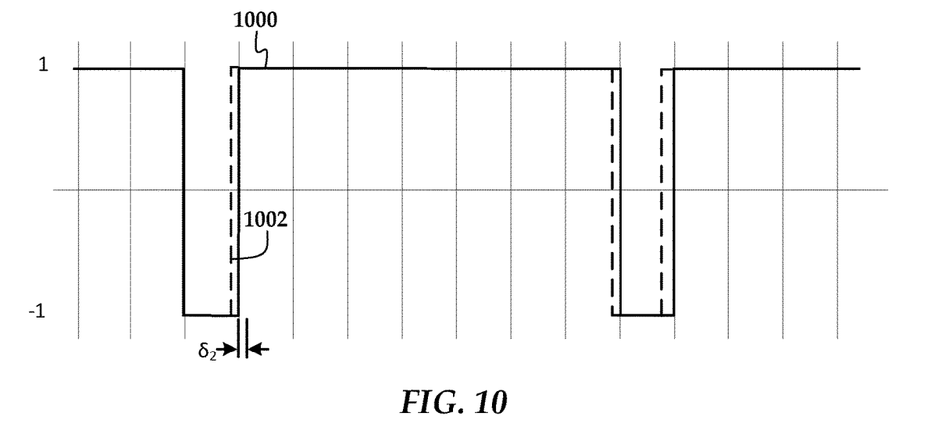
FIG. 10 is a diagram showing a signal waveform according to another example embodiment.

In FIG. 10, a signal diagram shows the decreasing of bit resolution according to an example embodiment. Waveform 1000 represents nominal bit timing used to write a series of bits to the recording medium. Waveform 1002 (dashed lines) represents the same series of bits written with the time of each transition decreased by the fractional amount $\delta_2$. Assuming this decrease is applied to each transition, the total length of the data sector will decrease. As with other embodiments, upon reading the signal 1002 back, the timing recovery circuits in the read channel will adjust to compensate for the decreased spacing between signal transitions when detecting the bits.

Figure 11:
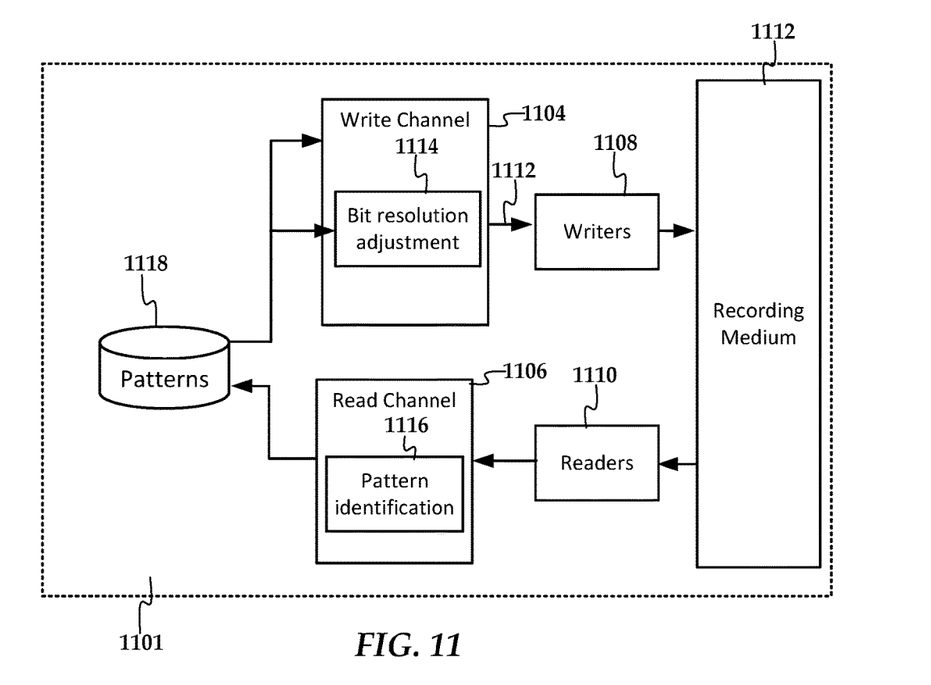
FIG. 11 is a block diagram of a system and apparatus according to an example embodiment.

In FIG. 11, a block diagram illustrates a system and apparatus according to an example embodiment. A processor/controller 1101 include a general-purpose and/or special purpose processors, logic circuits, signal processors, etc., that control a write channel 1104 and a read channel 1106. The write channel encodes data into signals that are sent to one or more write transducers 1108 that write to a magnetic recording medium 1112. The read channel 1106 receives signals from one or more read transducers 1110 that are held over the recording medium 1112.

The read channel 1106 performs a pattern identification function 1116 that looks at a set of patterns (e.g., byte patterns, multi-byte patterns, etc.) read back from the recording medium 1112. These patterns are analyzed to determine whether an unusually high or low error is associated with the patterns. The error may be estimated by looking at any combination of BER and SNR, in addition to other indicators, e.g., dibit response. Generally, a low SNR or high BER indicates high error rate, and high SNR or low BER indicates low error rate. This estimation may be performed by reading user data, PRBS, and/or a non-random sequence of test patterns. Patterns that result in unusually high or low measures of readback error are stored in a pattern database 1118.

After patterns have been identified and stored in the pattern database 1118, the write channel 1104 performs a bit resolution adjustment function 1114 that changes a timing of magnetic transitions written to the recoding medium 1112 by increasing the bit transition timing (thus the resolution) of error-prone patterns or by decreasing the bit transition timing of patterns that exhibit little error. Note that the pattern identification function 1116 and bit resolution adjustment function 1114 can be continuously operating during the life of the drive, such that the identified patterns and amount of bit resolution adjustment can change and adapt based on changing operating conditions (e.g., temperature, vibration, electromagnetic interference), aging of the drive, etc.

Figure 12:
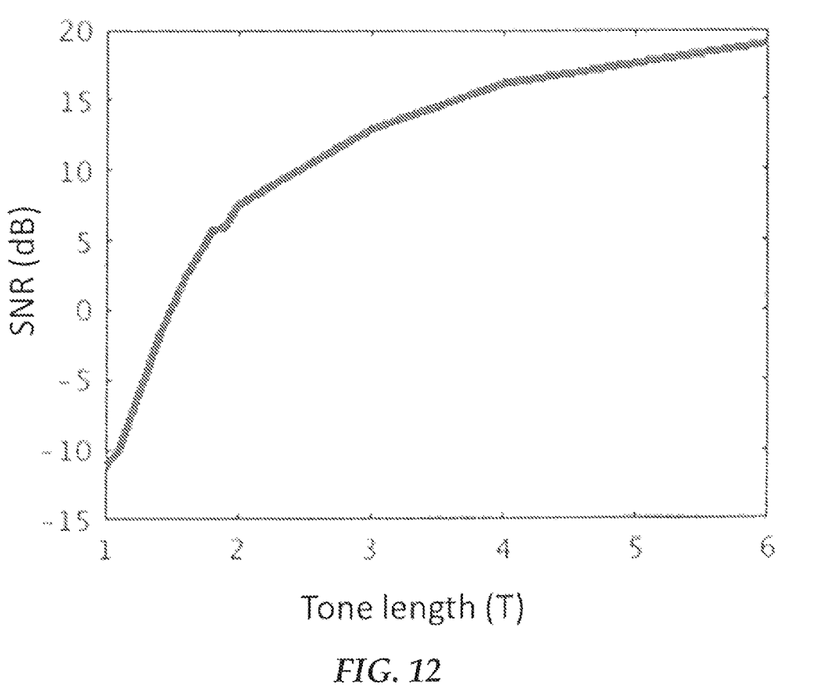
FIG. 12 is a graph showing results of a simulation according to an example embodiment.

In order to estimate the effect of increasing resolution on drive performance, a modeling simulation was run. This simulation involved determining SNR for different pure tone frequencies from 1 T to 6 T using a HAMR drive. Single tone isolated tracks were written on AC erased media and then read-back. The read-back waveforms were captured using a micromagnetic reader and SNR measured for multiple passes. The SNR measured as a function of tone length is shown in the graph of FIG. 12. From 1 T to 2 T, SNR increases by 1.7 dB per 0.1 T. From 2 T to 5 T, SNR increases by 2 dB per 0.5 T (or about 0.4 dB per 0.1 T). Beyond 5 T, less increase in SNR is observed. Given that performance is limited by the shortest marks, this suggests that much SNR gain be achieved if the short marks (1 T, 2 T) are increased in length, while decreasing the length of the long marks.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method, comprising:
   writing a plurality of different symbols to a magnetic recording medium at a nominal bit timing;
   determining a first set of the symbols that result in a relatively high error when read back;
   upon writing subsequent to the determining of the first set of symbols, identifying one symbol of the first, set of symbols within a data segment ready to be mitten to the magnetic recording medium; and
   writing the data segment with increased bit spacing relative to the nominal bit timing in response to identifying that the one symbol of the first set of symbols is within the data segment.

2. The method of claim 1, further comprising:
determining a second set of the symbols written to the magnetic recording medium that result in a relatively low error when read back;
upon writing subsequent to the determining of the second set of symbols, identifying one symbol of the second set of the symbols within a second data segment ready to be written to the magnetic recording medium; and
decreasing a second bit spacing of the second data segment relative to the nominal bit timing in response to identifying the one symbol of the second set of the symbols within the data segment.

3. The method of claim 1, wherein determining the first set of symbols mitten to a magnetic recording medium that result in a relatively high error comprises writing pseudo-random bit sequences and reading back the pseudo-random bit sequences to determine the set of symbols.

4. The method of claim 3, wherein the first set of symbols have a lowest signal-to-noise ratio of all symbols in the pseudo-random bit sequences.

5. The method of claim 3, wherein the first set of symbols have a highest bit error rate of all symbols in the pseudo-random bit sequences.

6. The method of claim 1, wherein determining the first set of symbols written to a magnetic recording medium that result in a relatively high error comprises reading back previously written user data to determine the set of symbols.

7. The method of claim 1; wherein the bit spacing is increased by a fractional amount between 1% to 100% of a single bit spacing.

8. A method, comprising:
writing a plurality of different symbols to a magnetic recording medium at a nominal bit timing;
determining a set of the symbols that result in a relatively low error when read back;
upon writing subsequent to the determining of the set of symbols, identify one symbol of the set of the symbols within a data segment ready to be written to the magnetic recording medium; and
write the data segment with decreased bit spacing relative to the nominal bit timing in response to identifying that the one symbol of the set of the symbol is within the data segment.

9. The method of claim 8, wherein determining the set of symbols written to a magnetic recording medium that result in a relatively low error comprises writing pseudo-random bit sequences and reading back the pseudo-random bit sequences to determine the set of symbols.

10. The method of claim 9, wherein the set of symbols have a highest signal-to-noise ratio of all symbols in the pseudo-random bit sequences.

11. The method of claim 9, wherein the set of symbols have a lowest bit error rate of all symbols in the pseudo-random bit sequences.

12. The method of claim 8, wherein determining the set of symbols written to a magnetic recording medium that result in a relatively low error comprises reading back previously written user data to determine the set of symbols.

13. The method of claim 8, wherein the bit spacing is decreased by a fractional amount between 1% to 50% of a single bit spacing.

14. An apparatus, comprising:
interface circuitry coupled to a head that reads from and writes to a magnetic recording medium; and
a controller coupled to the interface circuitry and operable to:
determine a set of symbols written to the magnetic recording medium that result in one of a relatively high error or relatively low error when read back;
upon writing subsequent to the determining of the set of symbols, identify one symbol of the set of the symbols within a data segment ready to be written to the magnetic recording medium; and
write the data segment with a changed bit spacing in response to identifying that the one symbol of the set of the symbols is within the data segment.

15. The apparatus of claim 14, wherein determining the set of symbols written to a magnetic recording medium that result in the relatively high or low error comprises writing pseudo-random bit sequences and reading back the pseudo-random bit sequences to determine the set of symbols.

16. The apparatus of claim 15, wherein the set of symbols have a lowest or highest signal-to-noise ratio of all symbols in the pseudo-random bit sequences.

17. The apparatus of claim 15, wherein the set of symbols have a highest or lowest bit error rate of all symbols in the pseudo-random bit sequences.

18. The apparatus of claim 14, wherein determining the set of symbols written to a magnetic recording medium that result in the relatively high or low error comprises reading back previously written user data to determine the set of symbols.

19. The apparatus of claim 14, wherein the set of symbols results in the relatively high error, the bit spacing being increased by a fractional amount between 1% to 100% of a single bit spacing.

20. The apparatus of claim 14, wherein the set of symbols results in the relatively low error, the bit spacings being decreased by a fractional amount between 1% to 50% of a single bit spacing.

* * * * *